United States Patent

Kobo et al.

Patent Number: 5,177,166
Date of Patent: Jan. 5, 1993

[54] FLUORINE-CONTAINING COPOLYMER AND METHOD OF PREPARING THE SAME

[75] Inventors: Motonobu Kobo, Minoo; Hiroshi Inukai, Takatsuki; Takahiro Kitahara, Suita; Kayoko Sugioka, Osaka, all of Japan

[73] Assignee: Daikin Industries Ltd., Osaka, Japan

[21] Appl. No.: 651,386

[22] PCT Filed: Jul. 6, 1990

[86] PCT No.: PCT/JP90/00870

§ 371 Date: Mar. 7, 1991

§ 102(e) Date: Mar. 7, 1991

[87] PCT Pub. No.: WO91/00880

PCT Pub. Date: Jan. 24, 1991

[30] Foreign Application Priority Data

Jul. 7, 1989 [JP] Japan .................. 1-176769
  Jun. 28, 1990 [JP] Japan .................. 2-172346

[51] Int. Cl.$^5$ ............................................. C08F 14/18
[52] U.S. Cl. ................................. 526/249; 526/247; 526/255
[58] Field of Search ................ 526/251, 247, 249, 255

[56] References Cited

FOREIGN PATENT DOCUMENTS 61-115916 6/1986 Japan .
62-29191 2/1987 Japan .
63-210114 8/1988 Japan .

Primary Examiner—Joseph L. Schofer
Assistant Examiner—N. Sarofim
Attorney, Agent, or Firm—Larson and Taylor

[57] ABSTRACT

The present invention provides a fluorine-containing copolymer comprising at least one fluoroolefin and at least one cyclic unsaturated compound represented by the formulas (I) and (II)

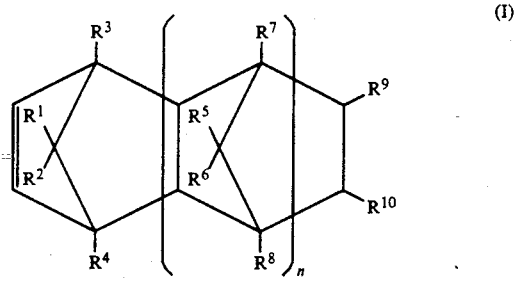

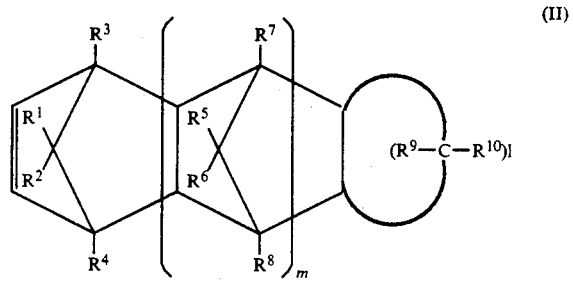

wherein each of n and m is 0 or a positive integer and preferably 0 or an integer of from 1 to 3, l is an integer of 3 or more than 3 and preferably 3 or 4, and $R^1$ to $R^{10}$ are the same or different and each represents a hydrogen atom, a halogen atom, a hydrocarbon group or a substituted hydrocarbon group and a method of preparing the same; and a fluorine-containing copolymer comprising at least one fluoroolefin, at least one cyclic unsaturated compound selected from the compounds of the above formulas (I) and (II) and at least one of mono and diolefins and a method of preparing the same.

4 Claims, No Drawings

FLUORINE-CONTAINING COPOLYMER AND METHOD OF PREPARING THE SAME

DESCRIPTION

1. Field of the Invention

The present invention relates to novel fluorinecontaining copolymers and processes for preparing them.

2. Background of the Invention

As fluorine-containing copolymers are well known copolymers of fluoroolefins such as tetrafluoroethylene (TFE) and chlorotrifluoroethylene (CTFE) and straight or branched chain olefins such as ethylene, propylene and alkyl vinyl ether. Since these fluorine-containing copolymers can be subjected to melt molding such as extrusion molding and injection molding and have excellent heat resistance, water resistance, weather resistance and like properties which are peculiar to fluororesins, they are useful as materials for container, heat or electric insulator, weather resistant film, etc.

Among the above fluorine-containing copolymers, copolymers of ethylene (E) and fluoroolefin are especially known as ETFE (ethylene-tetrafluoroethylene copolymer), ECTFE (ethylene-chlorotrifluoroethylene copolymer), etc. However, these copolymers are not applicable to optical materials since they are crystallizable and thus low in transparency. The copolymers are also not applicable to coating materials because of insolubility in organic solvents.

Further, copolymers of propylene, alkyl vinyl ether or the like and fluoroolefin are well dissolved in organic solvents. However, their low glass transition point of below 50° C. requires crosslinking before use, if heat resistance is required.

In recent years, there are known polymers which have cyclic structures in the main chains prepared by cyclic polymerization of perfluoroether (Unexamined Japanese Patent Publication No. 238111/1988). However, these copolymers are expensive since the monomers to be used are difficult to prepare. The copolymers are also costly and not preferable, because only special fluorinecontaining compounds can be used for solvents when the copolymers are applied to coating.

DISCLOSURE OF THE INVENTION

The present inventors conducted extensive research in view of the above problems and found that specific unsaturated compounds are copolymerized in the presence of radical polymerization initiators to prepare copolymers which have high glass transition point (Tg) and are excellent in solubility to organic solvent, transparency, heat resistance, low water absorption properties, mechanical properties, weather resistance, etc.

The present invention provides the following fluorine-containing copolymers and processes for preparing the same:

A fluorine-containing copolymer comprising at least one fluoroolefin and at least one cyclic unsaturated compound selected from the compounds represented by the formulas (I) and (II)

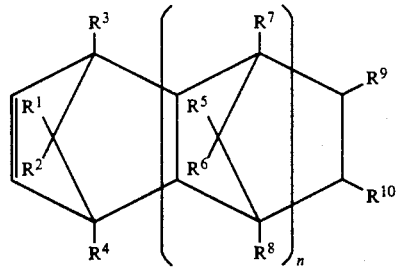

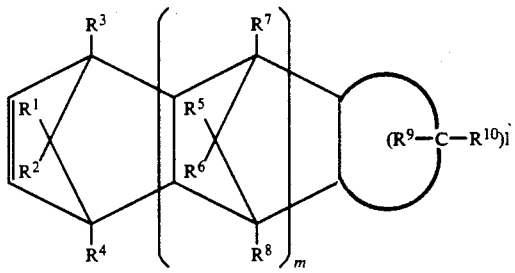

wherein each of n and m is 0 or a positive integer and preferably 0 or an integer of from 1 to 3, l is an integer of 3 or more than 3 and preferably 3 or 4, and $R^1$ to $R^{10}$ are the same or different and each represents a hydrogen atom, a halogen atom a hydrocarbon group or a substituted hydrocarbon group (hereinafter referred to as "copolymer A"); and a fluorine-containing copolymer comprising at least one fluoroolefin, at least one cyclic unsaturated compound selected from the compounds represented by the above formulas (I) and (II) and at least one of mono- and diolefins (hereinafter referred to as "copolymer B").

In the present invention, the fluoroolefins are preferably monoalkenes of 2 or 3 carbon atoms in which at least one hydrogen atom attached to the carbon atoms having a double bond is replaced by a fluorine atom and in which other hydrogen atoms are optionally replaced by chlorine atoms or $C_1$-$C_4$ perfluoroalkoxy groups. Such fluoroolefins include $CF_2=CF_2$, $CF_2=CFORf$ (Rf is $C_1$-$C_4$ perfluoroalkyl), $CF_2=CFCl$, $CF_2=CFCF_3$, $CF_2=CFH$, $CF_2=CH_2$, $CFH=CH_2$, etc, although not limited to these examples. Among these, tetrafluoroethylene and chlorotrifluoroethylene are preferable.

In the formula (I) or (II) representing cyclic unsaturated compounds to be used in the present invention, halogen atoms represented by $R^1$ to $R^{10}$ include bromine atom, fluorine atom, chlorine atom, etc., and chlorine and fluorine are preferable. Examples of hydrocarbon groups are methyl, ethyl, propyl, i-propyl, butyl and like $C_1$-$C_{10}$ alkyl groups. Examples of substituted hydrocarbon groups are $C_1$-$C_{10}$ fluoroalkyl groups such as $-CF_3$, $-CH_2CF_3$ and $-CH_2CF_2CF_3$, $C_1$-$C_6$ alkylcarboxyl groups such as $-COOCH_3$ and $-COOCH_2CH_3$, etc. Examples of the cyclic unsaturated compounds are as follows:

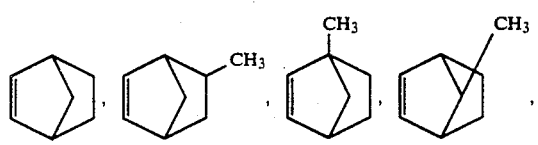

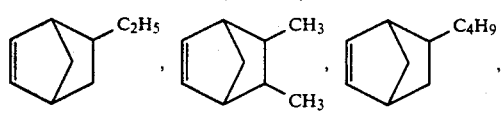
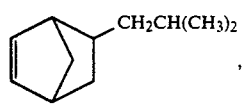
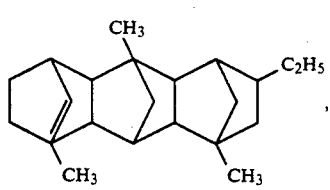
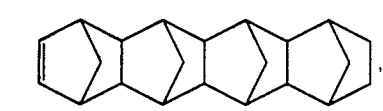
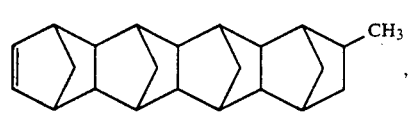
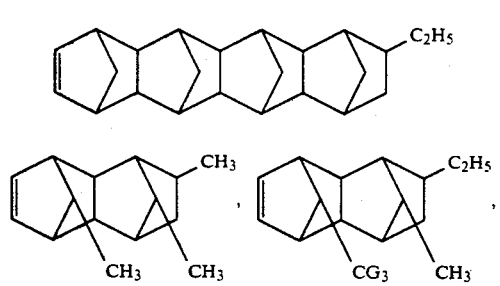
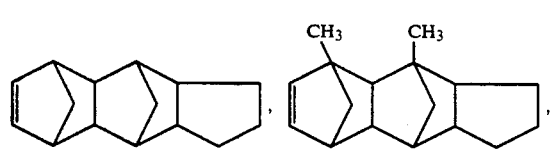
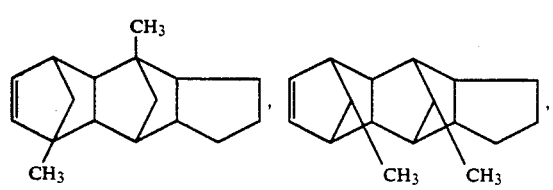
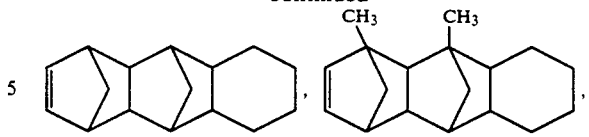
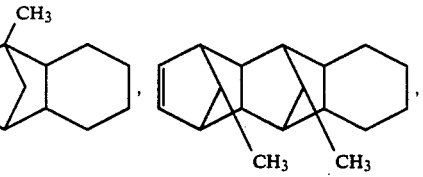
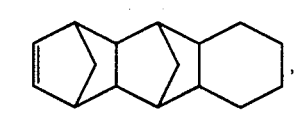
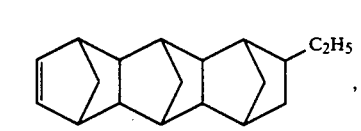
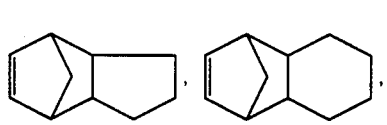
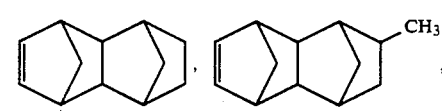
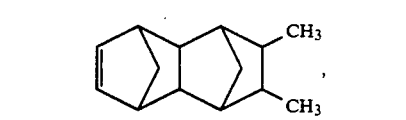
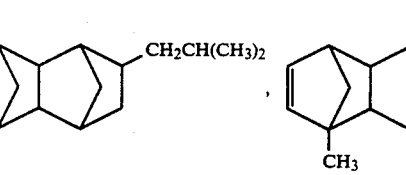
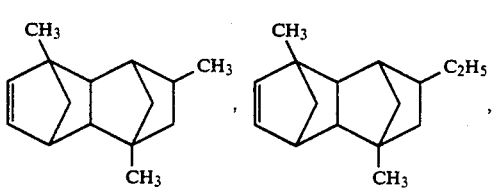

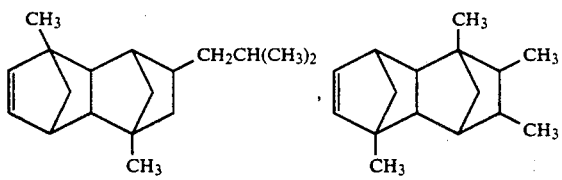

The above cyclic unsaturated compounds are used singly or in admixture. Of these compounds, 2-norbornane and 2-methyl-1,4,5,8-dimethano-1,2,3,4,4a,5,8,8a-octahydronaphthalene are preferable. Since 2-norbornane is readily available, it is particularly preferable.

The mono- and diolefins in the present copolymer B are $C_2$-$C_{10}$ monoalkene, $C_4$-$C_{10}$ dialkene and $C_9$-$C_{10}$ monoallylmonoalkene. Monoalkenes such as ethylene, propylene, isobutylene, 4-methylpentene, 4-methylhexene and 3-methylbutene, dialkenes such as butadiene and isoprene, and monoallylmonoalkenes such as 4-phenylbutene are exemplified, and ethylene, propylene, etc. are preferable.

In the present copolymer A, the proportion of fluoroethylene and cyclic saturated compound is 90 to 10 mole % / 10 to 90 mole %, preferably 70 to 30 mole % / 30 to 70 mole %, and more preferably 60 to 40 mole % / 40 to 60 mole %. If the proportion (mole %) of the two compounds is less than 10/90, weather resistance, electrical characteristics, etc. of the polymer will be worsened due to decreased content of fluorine. If the proportion is more than 90/10, reduced solubility to solvent tends to result.

The intrinsic viscosity of copolymer A is usually about 0.01 to about 20 (35° C., solvent: methyl ethyl ketone or dioxane). The copolymer preferably has Tg of not lower than 100° C., considering the required heat resistance when utilized for optical materials.

In the present copolymer B, the proportion of fluoroolefin, cyclic unsaturated compound and mono- and/or diolefin is generally 70 to 30 mole % / 20 to 70 mole % / 30 to 0.1 mole %, and preferably 60 to 40 mole % / 20 to 45 mole % / 30 to 5 mole %. If the amount of mono- and/or diolefin is less than 0.1 mole %, excellent flexibility will not be attained. If the amount is more than 30 mole %, high glass transition point will not be attained. Taking account of the weather resistance, electric properties, solvent-solubility, etc. and the above identified amount of mono- and/or diolefin, the amount of fluoroolefin in copolymer B is generally 70 to 30 mole %. Further the content of cyclic unsaturated compound (I) and/or (II) is, taking account of the mechanical properties, glass transition point, etc. and the above identified content of mono- and/or diolefin, is generally 20 to 70 mole %.

The intrinsic viscosity of copolymer B is usually about 0.01 to about 20 (35° C., solvent: methyl ethyl ketone, dioxane or butyl acetate). The copolymer preferably has Tg of not lower than 100° C., considering the desired heat resistance when it is used for optical materials.

The copolymer A of the invention can be prepared by copolymerizing preferably 4 to 97 mole % of fluoroethylene and 96 to 3 mole % of cyclic unsaturated compound of the formula (I) and/or (II).

The copolymer B of the invention can be prepared by copolymerizing 8 to 94 mole % of fluoroolefin, 92 to 4 mole % of cyclic unsaturated compound of the formula (I) and/or (II) and 0.1 to 6 mole % of mono- and/or diolefin.

In the present method of preparing copolymers A and B, at least one unsaturated cyclic compound having a functional group may be added as the third monomer, so far as the properties of copolymers are not damaged. The third monomer is added preferably in an amount of not more than 20 mole % of the copolymer, so far as this addition does not reduce Tg of the copolymer. When a cyclic unsaturated monomer having hydroxyl is added, the copolymer obtained can be cured by isocyanate, melamine, etc. When a monomer having epoxy group is added, the copolymer obtained can be cured by amine or the like. Such unsaturated cyclic monomers having functional groups are not specifically limited, and include the following:

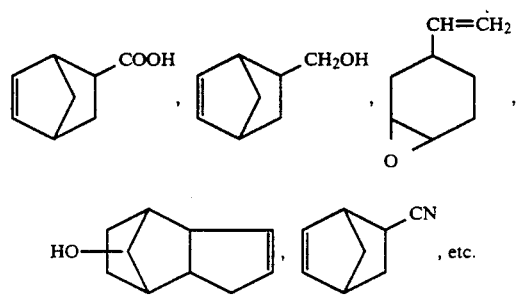

In the present method of preparing copolymers A and B, other monomers than the above cyclic unsaturated monomers can be also added in order to improve melt molding ability, flexibility and like properties of the copolymer obtained. Examples of such monomers are:

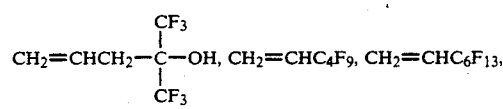

$CH_2$=$CFC_3F_6H$, $CH_2$=$CHOCH_2)CF_2CF_2)_2H$, etc. Vinyl ether (e.g., vinyl methyl ether, vinyl ethyl ether, etc.), vinyl ester (e.g., vinyl acetate, etc.), styrene, etc. can be further added to the copolymerization system. Such monomers are preferably added in an amount of not more than 20 mole % of all the monomers.

The present method of preparing copolymers A and B can be conducted with using a conventional polymerization initiator and without using special initiators such as tungsten compound, vanadium compound and aluminum compounds required to prepare homopolymers of cyclic unsaturated compounds, copolymers of cyclic unsaturated compounds and ethylene, or the like.

The copolymers A and B of the present invention can be prepared by usual radical polymerization. For example, the polymerization may be carried out in the presence of radical polymerization initiators under mild conditions. Examples of useful initiators of radical polymerization are conventional ones such as organic or inorganic initiators of radical polymerization, light and radiation. Such organic or inorganic radical polymerization initiators include azo compounds such as 2,2'-azobis(N,N'-dimethyleneisobutylamidine) dihydrochloride, 2,2'-azobis(2-amidinopropane) dihydrochloride, 2,2'-azobis(N,N'-dimethyleneisobutylamidine), 4,4=-azobis(4-cyanopentanoic acid), 2,2'-azobis{2- methyl-N-[1,1-bis(hydroxymethyl)-2- hydroxyethyl]-propionamide}, 2,2'-azobis{2-methyl-N-[1,1-bis(hydroxymethyl)ethyl]-propionamido, 2,2'-azobis[2-methyl-N-(2-hydroxyethyl)-propionamide], 2,2'-azobis-(isobutylamide) dihydrate, 2,2'-azobis(4-methoxy-2,4-dimethylvaleronitrile), 2,2'-azobis(2,4-dimethylvaleronitrile), (1-phenylethyl)-azodiphenylmethane, 2,2'-azobisisobutyronitrile, dimethyl 2,2-azobisisobutyrate, 2,2'-azobis(2-methylbutyronitrile), 1,1'-azobis(1-cyclohexanecarbonitrile), 2-(carbamoylazo)-isobutyronitrile, 2,2'-azobis(2,4,4-trimethylpentane), 2-phenylazo-2,4-dimethyl-4-methoxyvaleronitrile and 2,2'-azobis(2-methylpropane); organic peroxides such as stearoyl peroxide, diisopropyl peroxydicarbonate, benzoyl peroxide, 2,4-dichlorobenzoyl peroxide, acetyl peroxide, t-butyl hydroperoxide, cumene hydroperoxide, diisopropylbenzene hydroperoxide, p-menthane hydroperoxide, 2,5-dimethylhexane 2,5-dihydroperoxide, methyl ethyl ketone peroxide, cyclohexanone peroxide, di-t-butyl peroxide, dicumyl peroxide, t-butylcumyl peroxide, 2,5-dimethyl-2,5-di(t-butylperoxy)hexyne-3, octanoyl peroxide, decanoyl peroxide, lauroyl peroxide, t-butyl perbenzoate, t-butyl peracetate, t-butyl perpivalate, t-butyl perisobutyrate, t-butyl peroxyisopropylcarbonate, di-tbutyl diperphthalate, t-butyl perlaurate, 2,5-dimethyl-2,5-di(benzoylperoxy)hexane, di-perfluorobutanoic peroxide, di-perfluoro-3-oxa-2-methylhexanoic peroxide and di-perfluorononaic peroxide; inorganic peroxides such as $K_2S_2O_3$ and $(NH_4)_2S_2O_3$; and so on. Examples of light are visible light, ultraviolet light, etc. Light may be used with photosensitizers. Examples of radiation are gamma-, beta- or alpha-ray from radioactive isotopes such as $^{60}Co$, $^{192}Ir$, $^{170}Tm$ and $^{137}Cs$, electron beam from electron accelerators, etc.

Among the above initiators of polymerization, in view of easy control of polymerization reaction, organic initiators for radical polymerization are preferable, organic peroxides are more preferable, and diisopropyl peroxydicarbonate is particularly preferable.

In the present invention, polymerization can be done by block polymerization, suspension polymerization, emulsion polymerization, solution polymerization or like polymerization. This suspension polymerization are conducted in water and/or organic solvents such as 1,1,2-trichloro-1,2,2-trifluoroethane, 1,1-dichlorotetrafluoroethane, and like halogenated hydrocarbons. Emulsion polymerization is conducted in water in the presence of suitable emulsifiers such as ammonium perfluorooctanoate and sodium laurylsulfonate. Solution polymerization is conducted in a solvent in which reaction monomers are dissolved, and the resulting polymers may be dissolved or precipitated in the solvent. Examples of such solvents for solution polymerization are aliphatic hydrocarbons such as octane and hexane, ketons such as metyl isobutyl ketone, esters such as ethyl acetate, aromatic hydrocarbons such as xylene, chlorohydrocarbons such as 1,1,1-trichloroethane and 1,1,2,2-tetrachloroethylene, alcohols such as t-butanol, fluorohydrocarbons such as 1,1,2-trichloro-1,2,2-trifluoroethane and like solvents. Of these solvents fluorohydrocarbons are preferably used because of rare occurrence of chain transfer. Such solvents may be used singly or in admixture.

Conditions for polymerization can be appropriately selected. Considering ease of working, simplicity of devices, etc., polymerization is carried out usually at about 0° to about 150° C. and preferably at room temperature to about 100° C., usually under a pressure of reduced pressure to about 50 kg/cm$^2$G and preferably under a pressure of about 0 to about 20 kg/cm$^2$G. Conventional chain transfer agents are optionally added to the polymerization system.

The copolymers according to the present invention are excellent in transparence, heat resistance, low-water absorption properties, solvent solubility, mechanical properties, weather resistance, etc., and thus are useful as moistureproof coating materials for electronic parts, reflection protectors for optical parts, carrier coating materials for electrostatic image, weatherable coating materials, etc. in the form as dissolved in solvents such as chlorohydrocarbons (1,1,1-trichloroethane, etc.) and aromatic hydrocarbons (toluene, etc.). The present copolymer can be shaped into laser discs, optical fibers, optical lenses, etc. by injection molding or extrusion molding.

EXAMPLES

The present invention is described in more detail with reference to the following examples but the invention is not limited by these examples.

EXAMPLE 1

In a 200 ml-stainless steel shaking autoclave were placed 22.83 g (0.243 mole) of 2-norbornane, 60.0 g of 1,1,2-trichloro-1,2,2-trifluoroethane (R-113) and 1 g of diisopropyl peroxydicarbonate. This reaction vessel is cooled in Dry Ice-methanol, and degasification and replacement with nitrogen gas were conducted repeatedly. Then 33.5 g (0.288 mole) of chlorotrifluoroethylene (CTFE) was added thereto. The vessel was then placed in a thermostat at 42° C., and polymerization was done with stirring for 48 hours. During this polymerization, the pressure varied from initial 3.2 kg/cm$^2$G to 2.6 kg/cm$^2$G.

After completion of the reaction, the unreacted CTFE was removed by blowing, and the contents of the vessel were added into acetone, and 25 g of white powder precipitated.

This product was dissolved in heavy hydrogen-chloroform, and $^{19}$F-NMR, $^{13}$C-NMR and $^{1}$H-NMR were determined. The NMR data show that the product is a copolymer of CTFE and 2-norbornane. The $^{19}$F-NMR data show that the product is an alternating copolymer, and the $^{1}$H-NMR data show no peaks of double bond.

The physical properties of the copolymer obtained are as follows.

Elemental analysis (wt %): CL 52.3. H: 4.8. F: 26.7. Cl: 16.2.
CTFE/2-norbornane=48.5 mole %/51.5 mole %.
Glass transition point: 148° C.
Thermolysis initiating point: 300° C.
Solubility in solvents (room temperature):
Soluble in toluene and 1,1,1-trichloroethane,
insoluble in acetone and DMF.
Intrinsic viscosity: 0.396 (metyl ethyl ketone, 35° C.).

The film of 0.25 mm thickness, which was prepared by casting a toluene solution of the above copolymer, was colorless and transparent. The sheet of 2 mm thickness prepared by hot-pressing was also colorless and transparent.

EXAMPLE 2

In a 1l-stainless glass autoclave equipped with a stirrer, 36.6 g (0.389 mole) of 2-norbornane was placed at 5°

C., and degasification and replacement with nitrogen gas were repeated. After deaeration, 300 g of 1,1-dichloro-1,1,2,2-tetrachloroethane was added thereto. The temperature was then raised to 40° C., and tetrafluoroethylene (TFE) was added till the pressure was raised to 6.5 kg/cm$^2$G. A 5 ml portion of a solution of diisopropyl peroxycarbonate in 50% R-113 was press injected thereto. Reaction was carried out at 40° C. for 24 hours, TFE added to the reaction system if the pressure was reduced to 6 kg/cm$^2$G.

After completion of the reaction, the unreacted TFE was removed by blowing. Then the contents were added into ethanol, and 42 g of white powder precipitated.

This product was dissolved in CDCl$_3$, and $^{19}$F-NMR, $^{13}$C-NMR and $^1$H-NMR were determined. These NMR data show that the product is a copolymer of TFE and 2-norbornane.

The physical properties of the copolymer obtained are as follows.
Elemental analysis (wt %): CL 57.1. HL 5.3. F: 37.4.
TFE/2-norbornane=48.5 mole % / 51.5 mole %.
Glass transition point: 138° C.
Thermolysis initiating point: 283° C.
Intrinsic viscosity: 0.321 (metyl ethyl ketone, 35° C.)

The film which was prepared by casting a solution of the copolymer in 1,1,1-trichloroethane was colorless and transparent. The sheet prepared by hotpressing was also colorless and transparent.

EXAMPLE 3

In a 200 ml-stainless steel shaking autoclave were placed 22.29 g (0.237 mole) of 2-norbornane, 52.8 g of R-113 and 3 g of diisopropyl peroxydicarbonate. As described in Example 1, degasification and replacement with nitrogen gas were conducted repeatedly. A 47.1 g of hexafluoropropylene (HFP) was added thereto. The vessel was then placed in a thermostat at 41° C., and polymerization was done with shaking for 48 hours.

After completion of the reaction, the unreacted HFP was removed by blowing. Then the contents were added into methanol, and 1.8 g of white powder precipitated.

This product was dissolved in CDCl$_3$, and $^{19}$F-NMR, $^{13}$C-NMR and $^1$H-NMR were determined. The NMR data show that the product is a copolymer of HFP and 2-norbornane.

EXAMPLE 4

In a 250 ml-stainless steel shaking autoclave were placed 20 g of 2-methyl-1,4,5,8-dimethano-1,2,3,4,4a,5,8,8a-octahydronaphthalene (OHN) and 50 g of R-113. The autoclave was cooled in Dry Ice-methanol, and degased and replaced with nitrogen repeatedly. After the final degasification, 19 g (0.19 mole) of tetrafluoroethylene (TFE) and 1g of diisopropyl peroxydicarbonate were added thereto. The vessel was then placed in a thermostat at 40° C. and shaken for 48 hours.

After completion of the reaction, the contents were poured into a large quantity of methanol, and 3g of white powder precipitated.

13C-NMR data show that the product is a copolymer of 2-methyl-1,4,5,8-dimethano-1,2,3,4,4a,5,8,8a-octahydronaphthalene and TFE (TFE/OHN=49.3 mole % / 50.7 mole %).

EXAMPLE 5

Polymerization was conducted in the same manner as in Example 4, except that 20 g (0.164 mole) of 5-ethylbicyclo[2,2,1]hepto-2-ene (also known as "ethylnorbornane (EN)") and 28 g (0.187 mole) of CTFE was placed in an autoclave. A 4.6 g quantity of white powder then precipitated. The $^{13}$C NMR data show that this product is a copolymer of ethylnorbornane and CTFE (CTFE/EN=49.0 mole % / 51.0 mole %).

EXAMPLE 6

A 0.5 kg quantity of 1,1,2-trichloro-1,2,2-trifluoroethane (R-113) was placed in a 1:-glass autoclave equipped with a stirrer. This vessel was cooled in Dry Ice-methanol. Deaeration and replacement with nitrogen gas were repeated three times. After the final degasification, a 85.0 g (0.85 mole) quantity of tetrafluoroethylene (TFE), 20 g (0.213 mole) of norbornane (N) and 2.6 g (0.093 mole) of ethylene (E) were placed in the vessel. The autoclave temperature was elevated to 40° C., and 1g of diisopropyl peroxydicarbonate was added to the mixture with stirring. The heating was continued, and the autoclave was maintained at a temperature of 40° C. for 11 hours. During this reaction, the autoclave was also maintained under a pressure of 9.0 to 8.5 kg/cm$^2$G. That is to say, if the pressure was reduced to 8.5 kg/cm$^2$G, a mixture of TFE, N and E (51 mole %/ 42 mole %/ 7 mole %) was added to the reaction system to increase the pressure to 9.0 kg/cm$^2$G.

After the reaction, the unreacted gas was removed by blowing, and the contents were poured into methanol. A 40 g quantity of white powder thus precipitated.

The product was dissolved in heavy hydrogen-chloroform, and $^{13}$C-NMR was determined. The data show that the product is a copolymer of TFE, 2-norbornane and ethylene.

The physical properties of the copolymer obtained are as follows.
TFE/2-norbornane/ethylene=50 mole %/39 mole %/11 mole %.
Glass transition point: 113° C.
Thermolysis initiating point: 296° C.
Solubility in solvents (room temperature): Soluble in methyl ethyl ketone, methyl isobutyl ketone, chloroform, 1,1,1-trichloroethane, ethyl acetate and butyl acetate.
Intrinsic viscosity: 0.29 (metyl ethyl ketone, 35° C.).

The sheet of 1 mm thickness, which was prepared by hot-pressing the above copolymer, had 90% transmittance at 650 nm.

EXAMPLE 7

A 0.2 kg quantity of 1,2,2-trifluoro-1,2,2-trichloroethane was placed in a 0.4 l-stainless steel autoclave equipped with a stirrer. The vessel was cooled in Dry Ice-methanol. Deaeration and replacement with nitrogen gas were repeated three times, and the autoclave was finally degased. A 55.2 g (0.552 mole) quantity of tetrafluoroethylene (TFE), 5.0 g (0.053 mole) of 2-norbornane (N) and 49 g (1.75 moles) of ethylene (E) were placed in the vessel. The autoclave was heated to 40° C., and 0.35 g of diisopropyl peroxydicarbonate was added to the mixture with stirring. The stirring was continued, and the autoclave was maintained at a temperature of 40° C. for 10 hours. The pressure was kept under 15 to 14 kg/cm$^2$G through this operation. That is to say, if the pressure was reduced to 14 kg/cm$^2$G, a mixture of TFE, N and E (51 mole %/ 30 mole %/ 19 mole %) was added to the reaction system to increase the pressure to 15 kg/cm²G.

After the reaction, the unreacted gas was removed by blowing at room temperature, and the contents were poured into methanol. A 28 g quantity of white powder thus precipitated. The ¹³C-NMR data show that the product is a copolymer of TFE, 2-norbornane and ethylene.

The physical properties of the copolymer obtained are as follows.

TFE/2-norbornane/ethylene = 50 mole %/22 mole %/28 mole %.
Glass transition point: 104° C.
Thermolysis initiating point: 310° C.
Intrinsic viscosity: 0.56 (n-butyl acetate, 35° C.).
Solubility in solvents (room temperature):
Soluble in dioxane and chloroform.

EXAMPLE 8

A 0.5 kg quantity of 1,1,2-trichloro-1,2,2-trifluoroethane (R-113) was placed in a 1:-glass autoclave equipped with a stirrer. The vessel was cooled in Dry Ice-methanol. The vessel was deaerated and replaced with nitrogen gas three times, and finally degased. A 315 g (2.7 moles) quantity of chlorotrifluoroethylene (CTFE), 87 g (0.93 mole) of 2-norbornane (N) and 15 g (1.07 moles) of ethylene (E) were placed in the vessel. The autoclave was heated to 39° C., and 1g of diisopropyl peroxydicarbonate (IPP) was added to the mixture with stirring. While 0.5 g of IPP was further added thereto with stirring every 8 hours, the autoclave was maintained at a temperature of 39° C. for 48 hours. The pressure varied from initial 8.3 kg/cm²G to 4.9 kg/cm²G.

After the reaction, the contents were poured into methanol. A 165.3 g quantity of white powder thus precipitated.

The ¹⁹F-NMR data and ¹³C-NMR data show that the product is a copolymer of CTFE, 2-norbornane and ethylene.

The physical properties of the copolymer obtained are as follows.

CTFE/2-norbornane/ethylene = 47.03 mole %/23.64 mole %/29.33 mole %.
Glass transition point: 128° C.
Thermolysis initiating point: 284° C.
Intrinsic viscosity: 0.383 (metyhl ethyl ketone, 35° C.).
Solubility in solvents (room temperature):
Soluble in 1,1,2-trifluoro-1,1,2-trichloroethane.

EXAMPLE 9

In a 250 ml-stainless steel shaking autoclave was placed 50 g of 1,1,2-trichloro-1,2,2-trifluoroethane (R-113). The reaction vessel was cooled in Dry Ice-methanol, and deaeration and replacement with nitrogen gas were conducted three times. After the final degasification, 17.85 g (0.1785 mole) of tetrafluoroethylene (TFE), 12.2 g (0.13 mole) of 2-norbornane and 1.8 g (0.032 mole) of isobutylene (IB) were placed therein. The autoclave was heated to 50° C., and 0.3 g of diisopropyl peroxydicarbonate was injected with stirring, and the autoclave was maintained at a temperature of 50° C. for 35 hours. The pressure varied from initial 10 kg/cm²G to 4 kg/cm²G while this copolymerization.

After the reaction, the contents were poured into a large quantity of methanol. A 8 g quantity of white powder thus precipitated.

The ¹⁹F-NMR data and ¹³C-NMR data show that the product is a copolymer of tetrafluoroethylene, 2-norbornane and isobutylene.

The physical properties of the copolymer obtained are as follows.

TFE/N/IB = 49.2 mole %/25.9 mole %/24.9 mole %.
Glass transition point: 100° C.
Thermolysis initiating point: 281.4° C.
Intrinsic viscosity: 0.22 (methyl ethyl ketone, 35° C.).
Solubility in solvents (room temperature): Soluble in 1,1,2-trifluoro-1,2,2-trichloroethane.

EXAMPLE 10

Following the general procedure of Example 10, 22.4 g (0.192 mole) of chlorotrifluoroethylene (CTFE), 10.25 g (0.109 g) of 2-norbornane (N) and 1.7 g (0.04 mole) of propylene (Pr) were placed in an autoclave. The autoclave was kept at 50° C. followed by reaction for 35 hours.

After the reaction, the contents were poured into methanol, 13 g of white powder precipitating.

The ¹⁹F-NMR data and ¹³C-NMR data show that the product is a copolymer of chlorotrifluoroethylene, 2-norbornane and propylene.

The physical properties of the copolymer are as follows.

Glass transition point: 102° C.
Thermolysis initiating point: 288.1° C.
Intrinsic viscosity: 0.28 (methyl ethyl ketone, 35° C.).
Solubility in solvents (room temperature): Soluble in 1,1,2-trifluoro-1,2,2-trichloroethane.

EXAMPLE 11

In a 250 ml-shaking autoclave was placed 15 g (0.086 mole) of 2-methyl-1,4,5,8-dimethano-1,2,3,4,4a,5,8,8a-octahydronaphthalene (OHN) and 50 g of R-113. The reaction vessel was cooled in Dry Ice-methanol, and deaerated and replaced with nitrogen gas three times. After the final deaeration, 24.4 g (0.244 mole) of tetrafluoroethylene (TFE), 1.0 g (0.036 mole) of ethylene and 1 g of t-butyl peroxypivalate were placed therein. The autoclave was heated to 40° C. with stirring and this temperature was kept for 48 hours.

After the reaction, the contents were poured into methanol. A 2.2 g quantity of white powder thus precipitated.

The ¹³C-NMR data show that the product is a copolymer of TFE, OHN and E (49 mole %/ 22 mole %/ 29 mole %).

We claim:

1. A fluorine-containing copolymer comprising at least one fluoroolefin selected from the group consisting of monoalkenes of 2 of 3 carbon atoms in which at least one hydrogen atom attached to the carbon atoms having a double bond is replaced by a fluorine atom and in which other hydrogen atoms are optionally replaced by chlorine atoms or $C_1$-$C_4$ perfluoroalkoxy groups and at least one cyclic unsaturated compound selected from the compounds represented by the formulas (I) and (II)

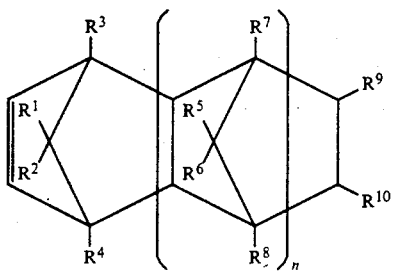

(I)

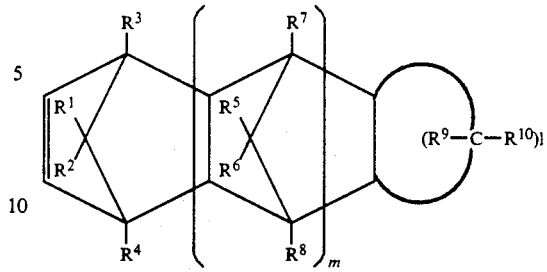

(II)

wherein each of n and m is 0 or a positive integer, l is an integer of 3 or more than 3, and $R^1$ to $R^{10}$ are the same or different and each represents a hydrogen atom, a halogen atom, a hydrocarbon group or a substituted hydrocarbon group.

2. A fluorine-containing copolymer according to claim 1 wherein the proportion of the fluoroolefin and the cyclic compound is 10 to 90 mole %/ 90 to 10 mole %.

3. A fluorine-containing copolymer according to claim 1 wherein the fluoroolefin is tetrafluoroethylene or chlorotrifluoroethylene.

4. A fluorine-containing copolymer according to claim 1 wherein the cyclic unsaturated compound is 2-norbornane or 2-methyl-1,4,5,8-dimethano-1,2,3,4,4a,5,8,8a-octahydronaphthalene.

* * * * *

UNITED STATES PATENT AND TRADEMARK OFFICE
CERTIFICATE OF CORRECTION

PATENT NO.   :   5,177,166
DATED        :   January 5, 1993
INVENTOR(S)  :   KUBO et al.

It is certified that error appears in the above-identified patent and that said Letters Patent is hereby corrected as shown below:

On the title page: Item

--[75]  Inventors

Motonobu KUBO, Osaka; Hiroshi INUKAI, Osaka; Takahiro KITAHARA, Osaka; Kayoko SUGIOKA, Osaka, all of JAPAN.

Signed and Sealed this

Sixteenth Day of November, 1993

Attest:

BRUCE LEHMAN

*Attesting Officer*   *Commissioner of Patents and Trademarks*